(12) United States Patent
Shurboff et al.

(10) Patent No.: US 8,223,217 B2
(45) Date of Patent: Jul. 17, 2012

(54) SOLID STATE SHUTTER DEVICES AND METHODS

(75) Inventors: Carl L. Shurboff, Grayslake, IL (US); Fan He, Gurnee, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 446 days.

(21) Appl. No.: 12/512,408

(22) Filed: Jul. 30, 2009

(65) Prior Publication Data

US 2011/0025906 A1 Feb. 3, 2011

(51) Int. Cl.
*H04N 5/228* (2006.01)
(52) U.S. Cl. ........... 348/222.1; 348/223.1; 348/224.1; 348/229.1
(58) Field of Classification Search .......... 348/222.1, 348/223.1, 224.1, 229.1, 362
See application file for complete search history.

(56) References Cited

U.S. PATENT DOCUMENTS

| | | | |
|---|---|---|---|
| 4,526,454 A | | 7/1985 | Suzuki et al. |
| 6,437,925 B1 | | 8/2002 | Nishioka |
| 6,794,628 B2 * | | 9/2004 | Yahav et al. ............ 250/214 R |
| 2004/0212723 A1 * | | 10/2004 | Lin .......................... 348/362 |
| 2006/0187327 A1 * | | 8/2006 | Mabuchi et al. ............ 348/294 |
| 2007/0121072 A1 | | 5/2007 | Misawa et al. |

FOREIGN PATENT DOCUMENTS

WO 9940478 8/1999

OTHER PUBLICATIONS

Patent Cooperation Treaty, International Search Report and Written Opinion of the International Searching Authority for International Application No. PCT/US2010/042692, Nov. 30, 2010, 12 pages.

* cited by examiner

*Primary Examiner* — Yogesh Aggarwal
(74) *Attorney, Agent, or Firm* — Gary J. Cunningham

(57) ABSTRACT

Disclosed are methods and devices for solid state electronically switched optical shutters of cameras and other devices. The disclosed non-mechanical camera shutter includes an electronically controlled material that provides optical density variation, to transition the shutter from being open to being closed. The layer of electronically controlled material is configured to change from substantially to transparent to substantially opaque, without scattering, by changing the state of the material. The transmittance period is the period of time that the layer changes transmittance from approximately 100% to approximately 0%. Electronic circuitry is in communication with a timing control module that is configured to provide a signal output to a transparent conductive layer proximal to the layer of electronically controlled material to initiate a change in its transmissivity. The described electronically switched optical component would add little or no additional bulk to a small camera.

15 Claims, 4 Drawing Sheets

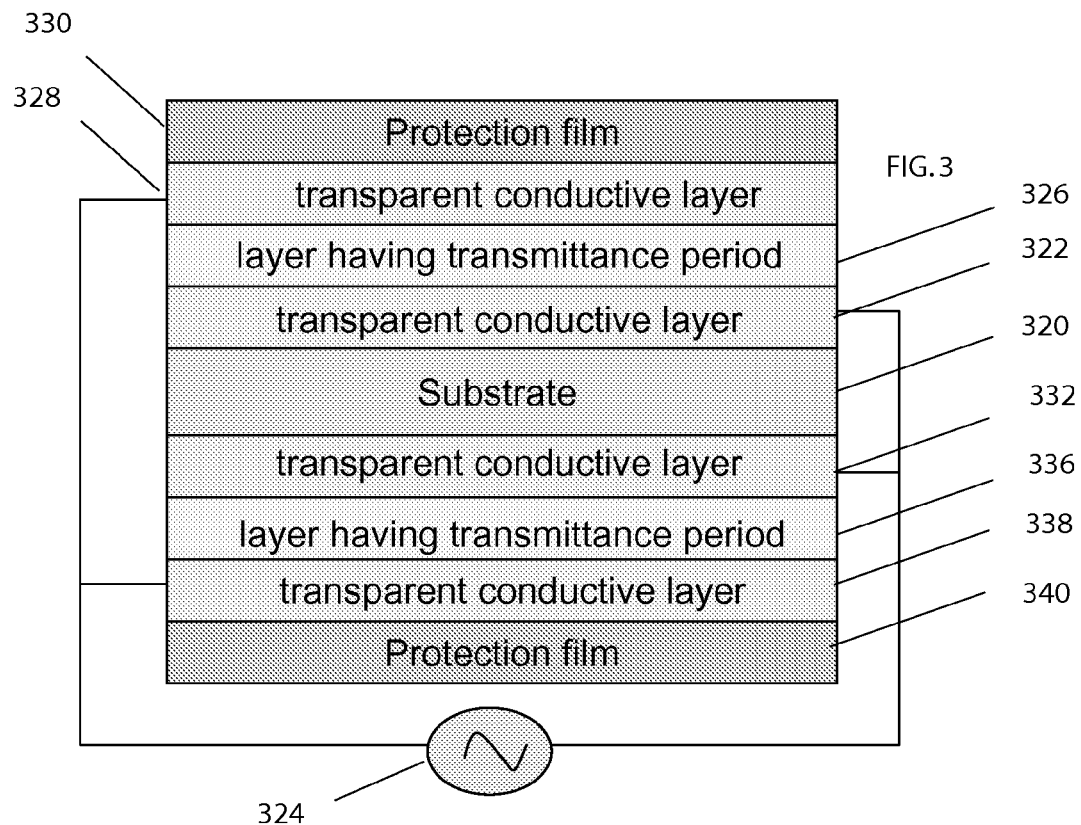
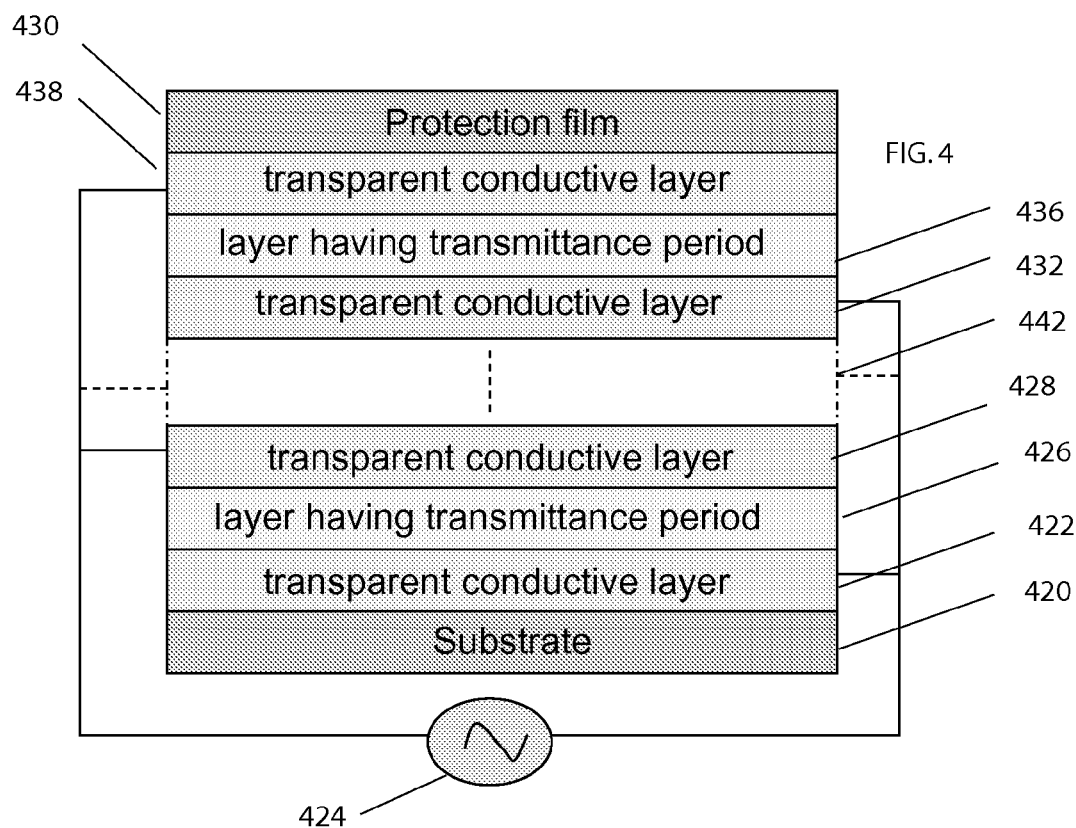

Long Exposure Time

Short Exposure Time

SOLID STATE SHUTTER DEVICES AND METHODS

FIELD

Disclosed are solid state shutter devices and methods, and more particularly a solid state camera shutters including an electronically switched optical component having a transmittance period during which it changes from being open to being closed.

BACKGROUND

The makers of mobile communication devices, including those of cellular telephones, are increasingly adding functionality to their devices. For example, cellular telephones commonly include features such as still and video cameras. A camera of a mobile communication device is quite small.

Camera shutters are complex electromechanical actuators and mechanisms. For small cameras, such shutters can be expensive to implement in terms of parts and manufacturing and may be prone to malfunction. Moreover, such shutters occupy valuable space in a space constrained small cameras.

BRIEF DESCRIPTION OF THE DRAWINGS

FIG. 3 depicts one or more embodiments of a two layer shutter design;

FIG. 4 depicts one or more embodiments of a multilayer shutter design;

DETAILED DESCRIPTION

Figure 1:
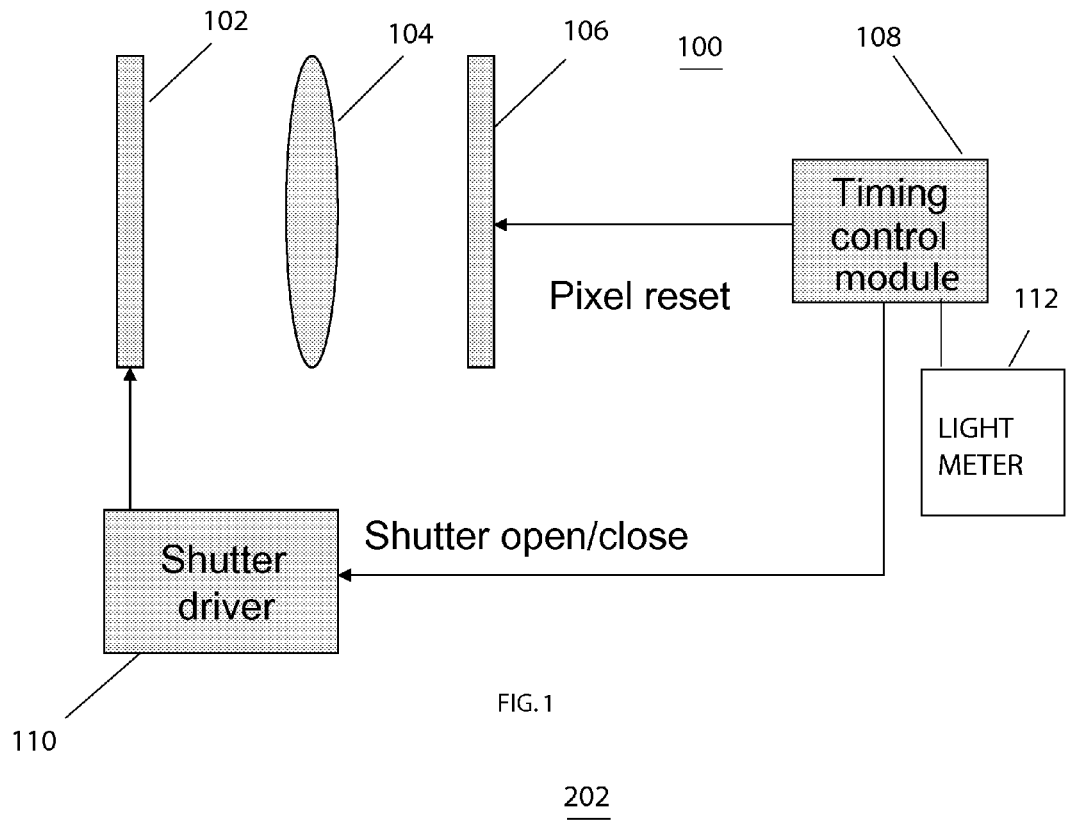
FIG. 1 depicts an embodiment of an electronically switched optical component that is incorporated into a device such as the camera of a mobile communication device.

Disclosed are methods and devices for electronically switched optical shutters of cameras and other devices. The disclosed non-mechanical camera shutter includes a solid state electronically controlled material that provides optical density variation to transition the shutter from being open to being closed. The electronically controlled material is configured to change from substantially transparent to substantially opaque, without scattering, by changing the state of the material.

The described electronically switched optical component includes a substrate and a transparent conductive layer proximal the substrate. The transparent conductive layer is configured to receive a signal which may be either a voltage from a voltage source or a current from a current source. A layer having a transmittance period is proximal to the transparent conductive layer and is configured to receive an electrical field via the transparent conductive layer. The transmittance period is the period of time that the layer changes transmittance from approximately 100% to approximately 0%. Electronic circuitry is in communication with a timing control module that is configured to provide the signal output to the transparent conductive layer to initiate a change in transmissivity of the layer having a transmittance period based upon timing control parameters of a device in which the electronically switched optical component is incorporated. Accordingly, the described electronically switched optical component would add little or no additional bulk to a small camera.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

FIG. 1 depicts an embodiment of an electronically switched optical component 102 that is incorporated into a device 100 such as the camera of a mobile communication device. A device 100 refers to a wide variety of devices. Such devices include, for example, cellular telephones, messaging devices, personal digital assistants (PDAs), notebook or laptop computers, mobile data terminals, application specific gaming devices, video gaming devices, and the like. It is understood that the device 100 incorporating an electronically switched optical component 102 can be a stand-alone camera, or any device incorporating any type of shutter.

In the use case of a camera, the device 100 may include a lens 104 and an image sensor 106. The pixels of the image sensor 106 are configured for activation and deactivation and to receive an image when activated. Electronic circuitry provides an activation signal to the pixels of the image sensor 106 based upon the pixel activation timing control module 108 input. The timing control module 108 provides for resetting the pixels and starting an exposure. The timing control 108 is in communication with the shutter (electronically switched optical component) 102 driver 110.

A starting signal is generated to initiate change in transmissivity of a layer having a transmittance period. The signal can be a voltage that creates an electric field to change the orientation of the molecules of the film. Alternatively, a current is used to heat a resistive conductive layer so that the change in temperature changes the orientation of the molecules of the film. The layer having a transmittance period is an adjustable interference filter. When not energized, some layers of this interference filter have one refractive index, and thus the filter has a visible reflective spectrum. When energized, the filter shifts from its reflective spectrum, so that the visible light will go through the filter. Preferably, the transmittance in transparent mode is greater than 90%. Preferably, transmittance in the reflective mode is less than 0.5%. Preferably, reflectance in the reflective mode is grater than 90%. Preferably in the transition state, there is no scattering. Preferably, the operation temperature is −20 C to 60 C, and its storage temperature is −40 C to 85 C. Preferably, the thickness is less than 0.25 mm. In one embodiment, it is composed of the compounds TN liquid crystal and polyolefin.

The electronic circuitry including the shutter driver 110 and the timing control module 108 is configured to provide a starting signal output to a transparent conductive layer of the shutter 102 to initiate a change in transmissivity of a layer having a transmittance period based upon pixel activation by timing control module 108 input. The timing control module 108 may be in communication with a light meter 112 to determine the length of time that the image sensor 106 receives the image. The exposure time is discussed in detail below.

The modules can carry out certain processes of the methods as described herein. Steps of methods may involve modules and modules may be inferred by the methods discussed herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below.

Figure 2:
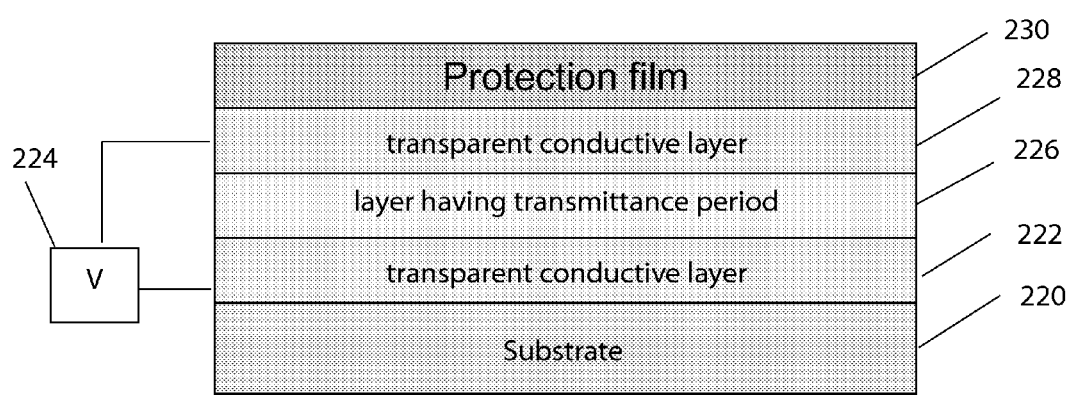
FIG. 2 depicts one or more embodiments of the described shutter.

FIG. 2 depicts one or more embodiments of the described shutter 202. A substrate 220 may be of any suitable substance such as glass or plastic. A transparent conductive layer 222 is proximal the substrate 220, the transparent conductive layer 222 being configured to receive a signal from a signal source 224. The transparent conductive layer 222 may be, for example, indium tin oxide (ITO). Alternative conductive layers are $SnO_2$ doped with Sb, F, As, Nb and/or Ta; ZnO doped with Al, Ga B, In Y, Sc, F, V, Si, Ge, Ti, Zr, Hf, Mg, As and/or H; $In_2O_3$ doped with SN Mo, Ta, W, Zr, Ge, Nb, Hf and/or Mg; CdO doped with In and/or Sn; $Ta_2O$, $GaInO_3$ doped with Sn and/or Ge; and $CdSb_2O_3$ doped with Y. A layer 226 having a transmittance period proximal to the transparent conductive layer 224 is configured to receive an electric field via the transparent conductive layer 222. The transmittance period provides a capability of the layer 226 to change transmittance from approximately 100% to approximately 0% over a predetermined period of time.

The layer 226 having a transmittance period may be for example, an electrochromatic material, such as Cholesteric liquid crystal, TN liquid crystal and polyolefin. The transmittance period may be, for example, 10 ms. It is understood that any material that provides optical density variation is within the scope of this discussion. That is, by applying an electric field to the material, the index of refraction of the layer 226 may change. The light passing through the layer 226 may become attenuated with substantially no distortion, going from clear to dark without scattering. Filters such as interference optical filters may be used to provide clarity during the transition. In another embodiment, the layer 226 may change from transparent to reflective. The length of the transition may be dependent upon the magnitude of the electric field as well.

In addition to the transparent conductive layer 222, a second transparent conductive layer 228 may be proximal layer 226 and may be configured to receive a signal via the layer 226. A protective layer or film 230 may be positioned proximal the transparent conductive layer 228 or at any other suitable location.

FIG. 3 depicts one or more embodiments of a two layer shutter design. A substrate 320 is between two stack ups. A substrate 320 may be of any suitable substance such as glass or plastic. A transparent conductive layer 322 is proximal the substrate 320, the transparent conductive layer 322 being configured to receive a signal from a signal source 324. In addition to the transparent conductive layer 322, a second transparent conductive layer 328 may be proximal layer 326 and may be configured to receive a signal from a signal source. A protective layer or film 330 may be positioned proximal the transparent conductive layer 328 or at any other suitable location.

A two layer design may provide for lower operating signal level and a better contrast ratio. Accordingly, another transparent conductive layer 332 is proximal the substrate 320, the transparent conductive layer 332 being configured to receive a signal from a signal source 324. In addition to the transparent conductive layer 332, another transparent conductive layer 338 may be proximal layer 336 and may be configured to receive a signal from a signal source. A protective layer or film 340 may be positioned proximal the transparent conductive layer 338 or at any other suitable location.

FIG. 4 depicts one or more embodiments of a multi-layered shutter design. A substrate 420 supports at least two stack ups. A transparent conductive layer 422 is proximal the substrate 420, the transparent conductive layer 422 being configured to receive a signal from a signal source 424. In addition to the transparent conductive layer 422, a second transparent conductive layer 428 may be proximal layer 426 and may be configured to receive a signal from a signal source.

A multilayered design may allow thinner layers 426 and 436 having a transmittance period and thus may provide for lower operating signal level. Accordingly, another transparent conductive layer 432 proximal layer 436 and may be configured to receive a signal from one or more a signal sources. A protective layer or film 440 may be positioned proximal the transparent conductive layer 438 or at any other suitable location. The space including a dotted line 442 indicates the option of positioning more stackups between the first stack up 422, 426 and 428 and the second stack up 432, 436 and 438.

Figure 5:
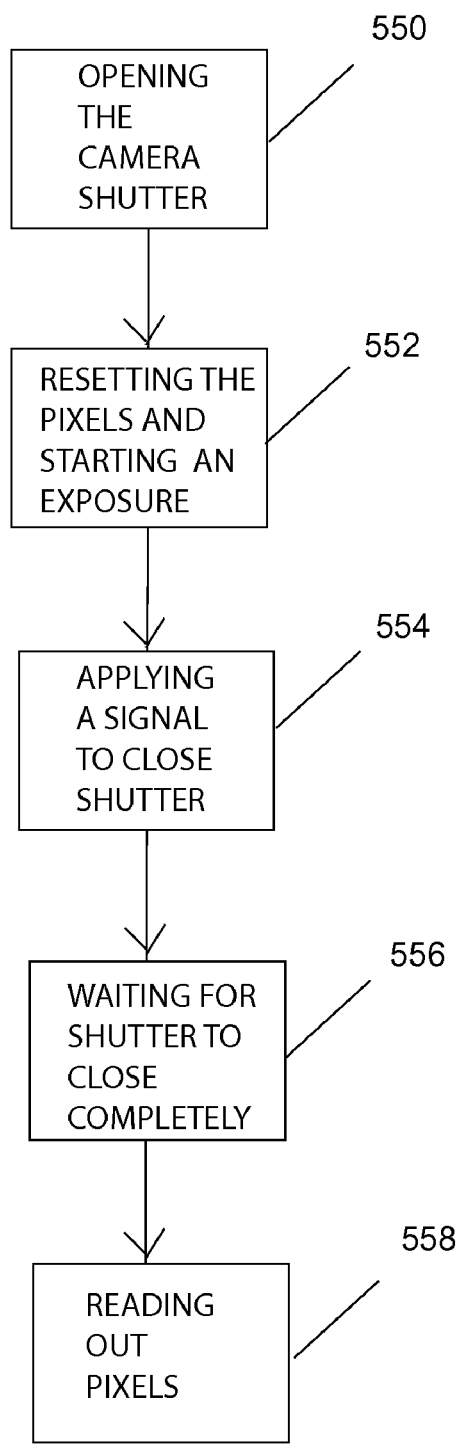
FIG. 5 relates to a long exposure time and is an embodiment of a method of a digital camera device including pixels 106 to receive an image and a camera shutter of at least one layer having a transmittance period to provide a long exposure.

FIG. 5 relates to a long exposure time and is an embodiment of a method of a digital camera device 100 (see FIG. 1) including pixels 106 to receive an image and a camera shutter 102 of at least one layer 226 having a transmittance period to provide for a long exposure. The method includes opening the camera shutter 550, and resetting the pixels and starting an exposure 552 during the transmittance period. Since the pixels are capable of receiving an image when activated, the pixels will be receiving an image as soon as the shutter starts to close by applying a signal 554. Applying a signal 554 will start the camera shutter to change from being open to being closed during the transmittance period. The method further includes waiting for the camera shutter to completely close 556 and then reading out the pixels 558.

Figure 6:
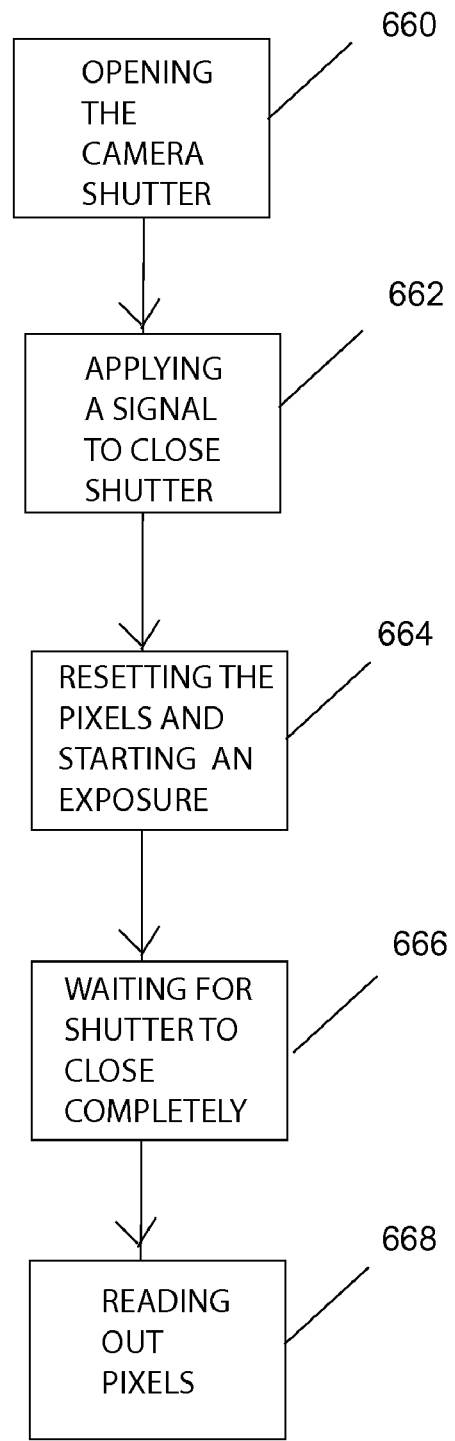
FIG. 6 relates to a short exposure time and is an embodiment of a method of a digital camera device including pixels to receive an image and a camera shutter of at least one layer having a transmittance period to provide a short exposure.

FIG. 6 relates to a short exposure time and is an embodiment of a method of a digital camera device 100 (see FIG. 1) including pixels 106 to receive an image and a camera shutter 102 of at least one layer having a transmittance period to provide a short exposure. The method includes opening the camera shutter 660 and applying a voltage 662 to start the camera shutter to change from being open to being closed during the transmittance period. While the shutter is closing, the method includes resetting the pixels and starting an exposure 664 during the transmittance period. The method can further include waiting for the camera shutter to completely close 666 and then reading out the pixels 668.

Figure 7:
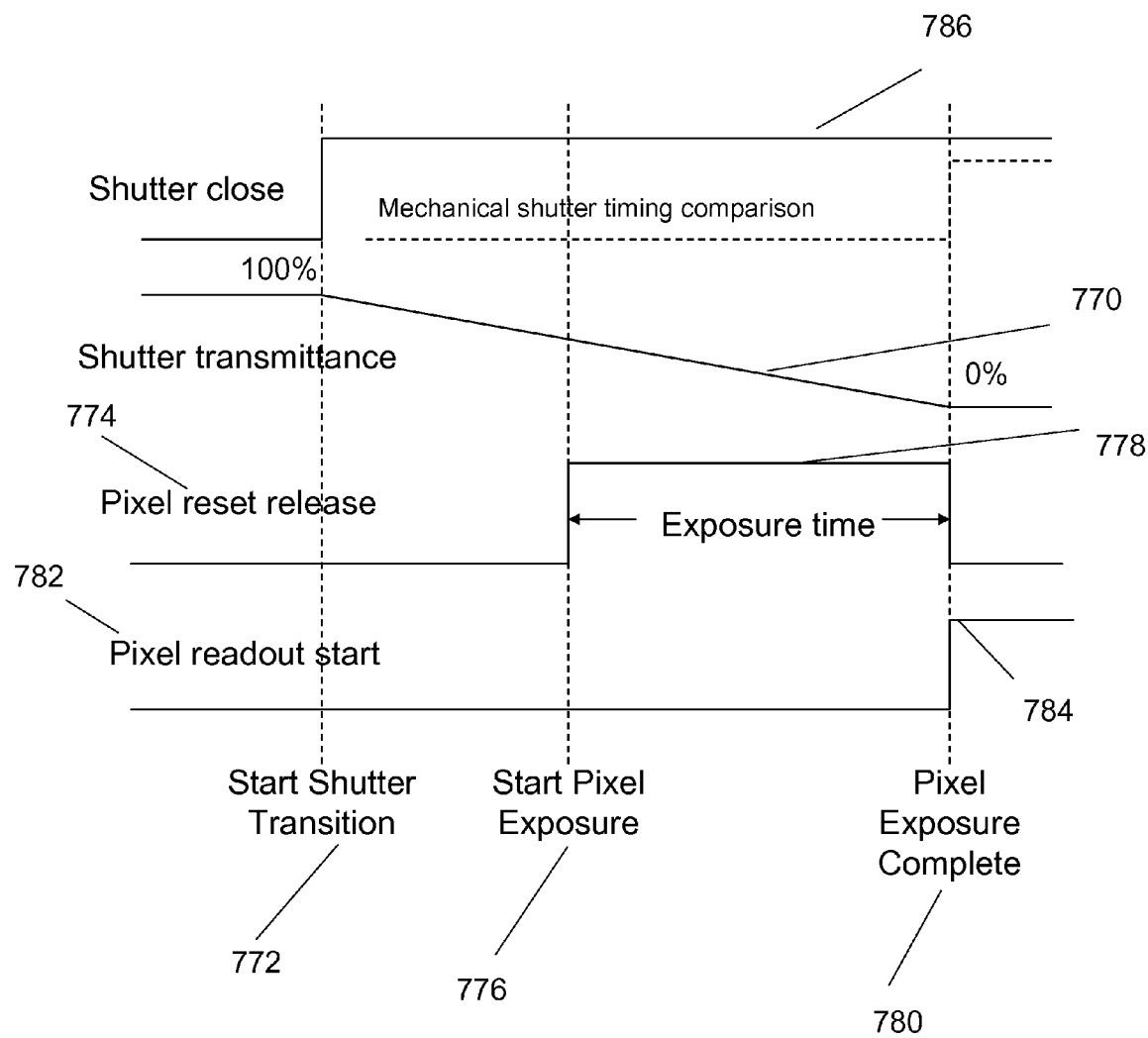
FIG. 7 is an example operational timing diagram for a short exposure time.

FIG. 7 is an example operational timing diagram for a short exposure time. As discussed above, the transmittance period is a pre-determined period of time which may be, for example, between approximately 1 and approximately 10 ms. During the transmittance period, the shutter transmittance 770 can change from approximately 100% to approximately 0% over the pre-determined period of time. Alternatively, the transmittance can change from approximately 0% to approximately 100%. As the timing control module 108 (see FIG. 1) signals the shutter driver 110 to transition the shutter 102 from being open to being closed. By initiating the shutter transition 772, the shutter transmittance 770 can change from 100% transmittance to 0% transmittance. During that time, the pixel reset release 774 can reset the pixels 106, and at a certain time, the pixel exposure can start 774. As mentioned, this example operational timing diagram represents a short exposure time. For a longer exposure time, the start pixel exposure 774 may occur sooner. For a long exposure time, the order of steps is described by FIG. 5.

The exposure time 778 may be determined by a light meter 112 (see FIG. 1) or manually. At the end 780 of the exposure time 778, the pixel readout 782 can start 784. To note a comparison between the method described solid state shutter a mechanical camera shutter, the timing operation of a mechanical shutter 786 is illustrated. As mentioned above, mechanical shutters are complex electromechanical actuators and mechanisms. For small cameras, mechanical shutters can be expensive to implement in terms of parts and manufacturing and may be prone to malfunction. Moreover, mechanical shutters occupy valuable space in a space constrained small cameras. Beneficially, the described electronically switched optical component would be inexpensive to produce, would be less prone to malfunction and would add little or no additional bulk to a small camera.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. An electronically switched optical component, comprising:
   a substrate;
   a transparent conductive layer proximal the substrate, the transparent conductive layer configured to receive a signal from a signal source or multiple signal sources;
   a layer having a transmittance period proximal to the transparent conductive layer and configured to receive a signal via the conductive layer wherein the transmittance period comprises a capability of the layer to change transmittance from approximately 100% to approximately 0% over a predetermined period of time; and
   electronic circuitry in communication with a timing control module configured to provide a signal output to the transparent conductive layer to initiate a change in transmissivity of the layer having a transmittance period.

2. A component of claim 1 wherein providing a signal output is based upon timing control parameters of a device in which the electronically switched optical component is incorporated.

3. The component of claim 1, further comprising:
   a second transparent conductive layer configured to receive a signal from a signal source or multiple signal sources proximal to the layer having a transmittance period.

4. The component of claim 1, and a protective film proximal the second conductive layer.

5. The component of claim 1, wherein the substrate has a non-planar top surface.

6. The component of claim 1 wherein the substrate has a non-planar bottom surface.

7. The component of claim 1, wherein the substrate has a top surface and a bottom surface, the further comprising:
   a third transparent conductive layer proximal the substrate, the third transparent conductive layer configured to receive a signal from a signal source or multiple signal sources, the third transparent conductive layer proximal the bottom surface of the substrate, whereas a first transparent conductive layer is proximal the top surface of the substrate;
   a second layer having a transmittance period proximal to the third conductive layer and configured to receive a signal via the third conductive layer.

8. The component of claim 7, further comprising:
   a fourth transparent conductive layer proximal the second layer having a transmittance period, the fourth transparent conductive layer configured to receive a signal from a signal source or multiple signal sources.

9. The component of claim 1 wherein the layer having a transmittance period comprises an electro-chromatic and transparent polymer films.

10. A camera, comprising:
    an image sensor with pixels configured for activation and deactivation and to receive an image when activated;
    electronic circuitry to provide an activation signal to the pixels based upon the pixel activation timing control input; and
    a shutter, wherein the shutter comprises:
    a substrate;
    a transparent conductive layer proximal the substrate, the transparent conductive layer configured to receive a signal from a signal source; and
    a layer having a transmittance period proximal to the transparent conductive layer and configured to receive a signal via the conductive layer wherein the transmittance period comprises a capability of the layer to change transmittance from approximately 100% to approximately 0% over a predetermined period of time; and
    electronic circuitry in communication with a timing control module configured to provide signal output to the transparent conductive layers to initiate a change in transmissivity of the layer having a transmittance period based upon pixel activation timing control input.

11. The camera of claim 10 further comprising a light meter wherein the timing control input is based on ambient light readings of the light meter.

12. The camera of claim 10, further comprising:

a second transparent conductive layer proximal to the layer having a transmittance period layer and configured to receive a signal from the electronic circuitry.

13. The camera of claim 10, wherein the substrate has a top surface and a bottom surface, further comprising:

a third transparent conductive layer proximal to the substrate, the third transparent conductive layer configured to receive a signal from a signal source, the third transparent conductive layer proximal the bottom surface of the substrate, whereas a first transparent conductive layer is proximal the top surface of the substrate;

a second layer having a transmittance period proximal to the third transparent conductive layer and configured to receive a signal via the third conductive layer.

14. The camera of claim 10, further comprising:

a fourth transparent conductive layer proximal to the second layer having a transmittance period, the fourth transparent conductive layer configured to receive a signal from a signal source or multiple signal sources.

15. The camera of claim 10 wherein the layer having a transmittance period comprises electro-chromatic films and transparent polymer films.

* * * * *